United States Patent
Park et al.

(10) Patent No.: US 8,654,886 B2
(45) Date of Patent: Feb. 18, 2014

(54) METHOD AND APPARATUS FOR TRANSMITTING/RECEIVING BROADCASTING-COMMUNICATION DATA

(75) Inventors: Sung-Ik Park, Daejon (KR); Hyoungsoo Lim, Daejeon (KR); Heung-Mook Kim, Daejon (KR); Soo-In Lee, Daejon (KR)

(73) Assignee: Electronics & Telecommunications Research Institute, Daejon (KR)

( * ) Notice: Subject to any disclaimer, the term of this patent is extended or adjusted under 35 U.S.C. 154(b) by 512 days.

(21) Appl. No.: 12/994,827

(22) PCT Filed: May 29, 2009

(86) PCT No.: PCT/KR2009/002878
§ 371 (c)(1),
(2), (4) Date: Nov. 26, 2010

(87) PCT Pub. No.: WO2009/145588
PCT Pub. Date: Dec. 3, 2009

(65) Prior Publication Data
US 2011/0075710 A1    Mar. 31, 2011

(30) Foreign Application Priority Data

May 29, 2008   (KR) .................. 10-2008-0050044
May 27, 2009   (KR) .................. 10-2009-0046540

(51) Int. Cl.
*H01L 27/04*      (2006.01)
*H04B 1/66*       (2006.01)

(52) U.S. Cl.
USPC .......................................... 375/295; 455/102

(58) Field of Classification Search
USPC .......... 375/295–298, 300, 302; 332/108, 119, 332/144, 145, 151; 455/91, 102, 108, 114.3
See application file for complete search history.

(56) References Cited

U.S. PATENT DOCUMENTS

| | | | |
|---|---|---|---|
| 2004/0174812 A1 | 9/2004 | Murakami et al. | |
| 2005/0153675 A1* | 7/2005 | Yoon | 455/302 |
| 2005/0185699 A1 | 8/2005 | Feher | |
| 2007/0291873 A1* | 12/2007 | Saito et al. | 375/298 |
| 2010/0104044 A1* | 4/2010 | Kishigami et al. | 375/299 |

FOREIGN PATENT DOCUMENTS

| | | |
|---|---|---|
| EP | 279625 A2 | 8/1988 |
| KR | 10-1999-0044450 A | 6/1999 |
| KR | 2001-0036928 A | 5/2001 |
| KR | 2002-0066661 A | 8/2002 |
| KR | 2004-0017858 | 2/2004 |
| KR | 2008-0079059 A | 8/2008 |
| WO | WO-97/09797 A1 | 3/1997 |

* cited by examiner

*Primary Examiner* — Young T. Tse
(74) *Attorney, Agent, or Firm* — Rabin & Berdo, P.C.

(57) ABSTRACT

An apparatus for transmitting and receiving broadcasting-communication data, the apparatus including an original signal generator configured to receive the original data and generate baseband original signals, a first modulator configured to receive the baseband additional signals and generate original signals of a predetermined band, an additional signal generator configured to receive the additional data and generate baseband additional signals, a second modulator configured to receive the baseband additional signals and generate additional signals of a predetermined band, an average power controller configured to control an average power of the additional signals of the predetermined band, an inserter configured to insert the additional signals of the predetermined band with a controlled average power to the original signals of the predetermined band to thereby generate mixed signals of a predetermined band, and a transmitter configured to transmit the mixed signals of the predetermined band.

9 Claims, 13 Drawing Sheets

METHOD AND APPARATUS FOR TRANSMITTING/RECEIVING BROADCASTING-COMMUNICATION DATA

TECHNICAL FIELD

The present invention relates to a method and apparatus for transmitting/receiving broadcasting-communication data.

BACKGROUND ART

Communication technology has made a progress by being divided into a cable transmission technology mainly providing a data service and a wireless transmission technology focusing on a speech service. Recent progress in high-speed wireless transmission technology and cable network infrastructure contributes to the continuous development of cable and wireless integrated technologies that can provide a data service while securing mobility. The cable-wireless integrated technology can provide users with a variety of services with no regional restriction.

Meanwhile, broadcasting technology is undergoing a dramatic change from analog scheme to digital scheme. The change in the broadcasting technology has made it possible to provide users with even more abundant sorts of services such as bi-directional broadcasting service and additional services as well as typical real-time broadcasting services. A broadcasting system occupies one axis of information infrastructure in combination with a communication system, such as cable and wireless internet. A broadcasting system and a communication system, which used to be separate systems independent from each other, are organically combined with each other and make advances.

Generally, broadcasting-communication system exists in the form of diverse systems developed to provide diverse services. The data transmission rate of the broadcasting-communication system is determined according to the standard of a corresponding technological area. For example, the standard data transmission rate of the Advanced Terrestrial Systems Committee (ATSC) 8-Vestigial Sideband (VSB) is 19.39 Mbps at 6 MHz band, whereas the standard data transmission rate of Digital Video Broadcasting-Terrestrial (DVB-T) ranges from at least 4.354 Mbps up to 27.710 Mbps at 7 MHz band. Also, the standard data transmission rate of the Terrestrial-Digital Multimedia Broadcasting (T-DMB) is 1.125 Mbps at 1.536 MHz band.

Meanwhile, development of diverse services and contents produces services of a new concept such as a data broadcasting service, a non-real time (NRT) service, a disaster alert service and so forth. This calls for technical schemes that can support and transmit the additional services. Conventional broadcasting-communication system uses a method of reducing the data transmission rates of an original service and allocating a new service to the reserved data transmission rate. In other words, some of the bandwidth to be allocated to the original service is allocated to an additional service. As a result, the bandwidth to be allocated to the original service is reduced. In an ATSC 8-VSB system, among 19.39 Mbps allocated to a High-Definition (HD) broadcasting, about 2 Mbps is allocated to a new additional service such as a data broadcasting, and the remaining 17.4 Mbps is allocated to the original HD broadcasting service. Since this method reduces the data transmission rate of the original service to transmit the new additional service, there is a drawback in that the quality of the original service is deteriorated. Therefore, it is required to develop a data transmission method that can transmit additional data without affecting the transmission of original data.

DISCLOSURE

Technical Problem

An embodiment of the present invention is directed to providing a method and apparatus that can improve the overall transmission efficiency of a system by transmitting new additional data while maintaining the data transmission rate of original data.

Other objects and advantages of the present invention can be understood by the following description, and become apparent with reference to the embodiments of the present invention. Also, it is obvious to those skilled in the art of the present invention that the objects and advantages of the present invention can be realized by the means as claimed and combinations thereof.

Technical Solution

In accordance with an aspect of the present invention, there is provided an apparatus for transmitting broadcasting-communication data including original data and additional data, which includes: an original signal generator configured to receive the original data and generate baseband original signals; a first modulator configured to receive the baseband additional signals and generate original signals of a predetermined band; an additional signal generator configured to receive the additional data and generate baseband additional signals; a second modulator configured to receive the baseband additional signals and generate additional signals of a predetermined band; an average power controller configured to control an average power of the additional signals of the predetermined band; an inserter configured to insert the additional signals of the predetermined band with a controlled average power to the original signals of the predetermined band to thereby generate mixed signals of a predetermined band; and a transmitter configured to transmit the mixed signals of the predetermined band.

In accordance with another aspect of the present invention, there is provided an apparatus for transmitting broadcasting-communication data including original data and additional data, which includes: an original signal generator configured to receive the original data and generate baseband original signals; an additional signal generator configured to receive the additional data and generate baseband additional signals; an average power controller configured to control an average power of the baseband additional signals; an inserter configured to insert the baseband additional signals with a controlled average power to the baseband original signals to thereby generate baseband mixed signals; a modulator configured to receive the baseband mixed signals and generate mixed signals of a predetermined band; and a transmitter configured to transmit the mixed signals of the predetermined band.

In accordance with another aspect of the present invention, there is provided a method for transmitting broadcasting-communication data including original data and additional data, which includes: receiving the original data and generating baseband original signals; receiving the baseband original signals and generating original signals of a predetermined band; receiving the additional data and generating baseband additional signals; receiving the baseband additional signals and generating additional signals of a predetermined band;

controlling an average power of the additional signals of the predetermined band; inserting the additional signals of the predetermined band with a controlled average power to the original signals of the predetermined band to thereby generate mixed signals of a predetermined band; and transmitting the mixed signals of the predetermined band.

In accordance with another aspect of the present invention, there is provided a method for transmitting broadcasting-communication data including original data and additional data, which includes: receiving the original data and generating baseband original signals; receiving the additional data and generating baseband additional signals; controlling an average power of the baseband additional signals; inserting the baseband additional signals with a controlled average power to the baseband original signals to thereby generate baseband mixed signals; receiving the baseband mixed signals and generating mixed signals of a predetermined band; and transmitting the mixed signals of the predetermined band.

In accordance with another aspect of the present invention, there is provided a broadcasting-communication data receiving apparatus for receiving mixed signals including original signals and additional signals, which includes: a receiver configured to receive the mixed signals and output mixed signals of a predetermined band; a first demodulator configured to receive the mixed signals of the predetermined band and generate baseband mixed signals; an original data generator configured to receive the baseband mixed signals and generate original data; an original signal generator configured to receive the original data and generate baseband original signals; a modulator configured to receive the baseband original signals and generate original signals of a predetermined band; a subtractor configured to subtract the original signals of the predetermined band from the mixed signals of the predetermined band to thereby generate additional signals of a predetermined band; a second demodulator configured to receive the additional signals of the predetermined band and generate baseband additional signals; and an additional data generator configured to receive the baseband additional signals and generate additional data.

In accordance with another aspect of the present invention, there is provided a broadcasting-communication data receiving apparatus for receiving mixed signals including original signals and additional signals, which includes: a receiver configured to receive the mixed signals and output mixed signals of a predetermined band; a demodulator configured to receive the mixed signals of the predetermined band and generate baseband mixed signals; an original data generator configured to receive the baseband mixed signals and generate original data; an original signal generator configured to receive the original data and generate baseband original signals; a subtractor configured to subtract the baseband original signals from the baseband mixed signals to thereby generate baseband additional signals; and an additional data generator configured to receive the baseband additional signals and generate additional data.

In accordance with another aspect of the present invention, there is provided a broadcasting-communication data receiving method for receiving mixed signals including original signals and additional signals, which includes: receiving the mixed signals and outputting mixed signals of a predetermined band; receiving the mixed signals of the predetermined band and generating baseband mixed signals; receiving the baseband mixed signals and generating original data; receiving the original data and generating baseband original signals; receiving the baseband original signals and generating original signals of a predetermined band; subtracting the original signals of the predetermined band from the mixed signals of the predetermined band to thereby generate additional signals of a predetermined band; receiving the additional signals of the predetermined band and generating baseband additional signals; and receiving the baseband additional signals and generating additional data.

In accordance with another aspect of the present invention, there is provided a broadcasting-communication data receiving method for receiving mixed signals including original signals and additional signals, which includes: receiving the mixed signals and outputting mixed signals of a predetermined band; receiving the mixed signals of the predetermined band and generating baseband mixed signals; receiving the baseband mixed signals and generating original data; receiving the original data and generating baseband original signals; subtracting the baseband original signals from the baseband mixed signals to thereby generate baseband additional signals; and receiving the baseband additional signals and generating additional data.

Advantageous Effects

The technology of the present invention described above can improve the overall transmission efficiency of a system by transmitting new additional data while maintaining the data transmission rate of original data.

BRIEF DESCRIPTION OF THE DRAWINGS

FIG. 16 shows an orthogonal sequence generated in a despreading sequence generator shown in FIG. 15.

BEST MODE FOR THE INVENTION

Figure 1:
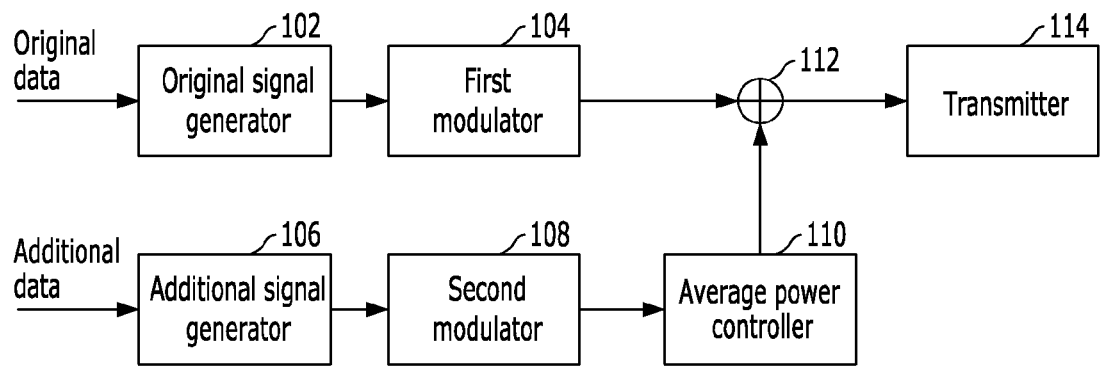
FIG. 1 is a block view of a broadcasting-communication data transmitting apparatus in accordance with an embodiment of the present invention.

The advantages, features and aspects of the invention will become apparent from the following description of the embodiments with reference to the accompanying drawings, which is set forth hereinafter. When it is considered that detailed description on a prior art may obscure a point of the present invention, the description will not be provided. Hereafter, specific embodiments of the present invention will be described in detail with reference to the accompanying drawings. The same reference numerals are given to the same constituent elements, although they appear in different drawings.

Hereafter, broadcasting or communication data that used to be provided to users will be referred to as original data, and data to be provided additionally to the users other than the original data will be referred to as additional data.

FIG. 1 is a block view of a broadcasting-communication data transmitting apparatus in accordance with an embodiment of the present invention. Referring to FIG. 1, the broadcasting-communication data transmitting apparatus includes an original signal generator 102, a first modulator 104, an additional signal generator 106, a second modulator 108, an average power controller 110, an additional data inserter 112, and a transmitter 114.

The original signal generator 102 receives original data and generates baseband original signals in conformity with the transmission standard of a broadcasting-communication system. The first modulator 104 receives the baseband original signals generated in the original signal generator 102 and modulates them into original signals of a predetermined band.

The additional signal generator 106 receives additional data and generates baseband additional signals in conformity with the transmission standard of the broadcasting-communication system. The second modulator 108 receives the baseband additional signals generated in the additional signal generator 106 and modulates them into additional signals of a predetermined band.

The average power controller 110 controls the average power of the additional signals of the predetermined band generated in the second modulator 108. Herein, the reason why the average power of the additional signals of the predetermined band is controlled is that the additional signals of the predetermined band are band-spread and inserted in the form of noise, which scarcely affects the original signals of the predetermined band. Therefore, the average power controller 110 controls the average power of the additional signals of the predetermined band as long as the original signals are not affected.

The additional data inserter 112 inserts the additional signals of the predetermined band whose average power is controlled by the average power controller 110 into the original signals of the predetermined band generated in the first modulator 104 to thereby generate mixed signals of a predetermined band including the original signals and the additional signals mixed with each other.

The transmitter 114 transmits the mixed signals of the predetermined band generated in the additional data inserter 112. If necessary, the transmitter 114 may convert the mixed signals of the predetermined band into radio frequency (RF) band, which is appropriate for wireless transmission.

Figure 2:
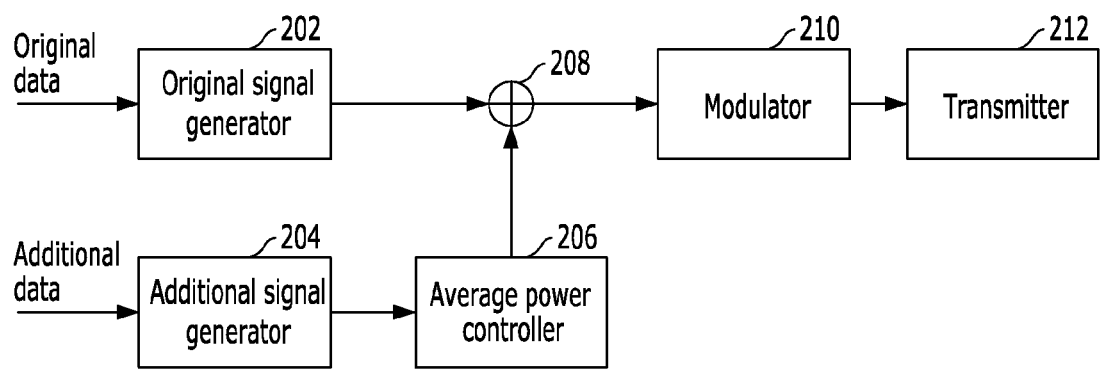
FIG. 2 is a block view of a broadcasting-communication data transmitting apparatus in accordance with another embodiment of the present invention.

FIG. 2 is a block view of a broadcasting-communication data transmitting apparatus in accordance with another embodiment of the present invention. Referring to FIG. 2, the broadcasting-communication data transmitting apparatus includes an original signal generator 202, an additional signal generator 204, an average power controller 206, an inserter 208, a modulator 210, and a transmitter 212.

The original signal generator 202 receives original data and generates baseband original signals in conformity with the transmission standard of a broadcasting-communication system. The additional signal generator 204 receives the additional signals and generates baseband additional signals in conformity with the transmission standard of the broadcasting-communication system.

The average power controller 206 controls the average power of the baseband additional signals generated in the additional signal generator 204.

The inserter 208 inserts the additional signals of the predetermined band whose average power is controlled by the average power controller 206 into the original signals of the predetermined band generated in the original signal generator 202 to thereby produce baseband mixed signals.

The modulator 210 receives the baseband mixed signals generated in the inserter 208 and modulates them into mixed signals of a predetermined band.

The transmitter 212 transmits the mixed signals of the predetermined band generated in the modulator 210. If necessary, the transmitter 212 may convert the mixed signals of the predetermined band into RF band, which is appropriate for wireless transmission.

Since the broadcasting-communication data transmitting apparatus of FIG. 2 uses one modulator, it has lower hardware complexity than the structure of FIG. 1. Also, since the insertion of the additional signals into the original signals is performed at baseband, it can be easily realized.

Figure 3:
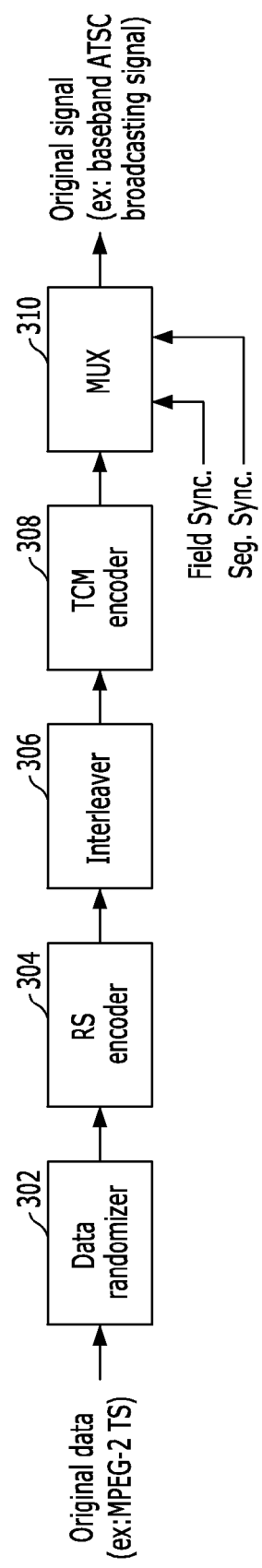
FIG. 3 is a block view of an original signal generator shown in FIGS. 1 and 2.

FIG. 3 is a block view of an original signal generator 102 or 202 shown in FIGS. 1 and 2.

The original signal generator 102 of FIG. 1 or the original signal generator 202 of FIG. 2 may be formed in various forms. FIG. 3 presents an example. The drawings shows a block view of an original signal generator according to the Advanced Terrestrial Systems Committee (ATSC) 8-Vestigial SideBand (VSB) transmission standard, where Moving Picture Experts Group (MPEG) 2 Transport Stream (TS) is used as original data.

As illustrated in FIG. 3, the original signal generator includes a data randomizer 302, a Reed Solomon (RS) encoder 304, an interleaver 306, a Trellis Coded Modulation (TCM) encoder 308, and a multiplexer (MUX) 310.

The data randomizer 302 receives original data, e.g., MPEG-2 transport stream, and spreads the spectrum of the received original data throughout the entire band. This is to prevent energy from being concentrated on a specific frequency.

The RS encoder 304, which has excellent burst error correction capability, decreases errors occurring in the randomized original data outputted from the data randomizer 302 by performing outer encoding. The interleaver 306 regularly rearranges the RS-encoded original data to prevent burst error.

The interleaved original data outputted from the interleaver 306 undergo inner encoding in the TCM encoder 308, which is a sort of convolutional encoder. The inner-encoded original data obtained in the TCM encoder 308 are multiplexed with a field synchronization signal and a segment synchronization signal in the multiplexer 310 to be converted into baseband ATSC broadcasting signal.

The additional signal generator of the broadcasting-communication data transmitting apparatus suggested in the embodiment of the present invention is not limited to the ATSC 8-VSB system shown in FIG. 3, and diverse broadcasting-communication standards may be applied thereto.

Figure 4:
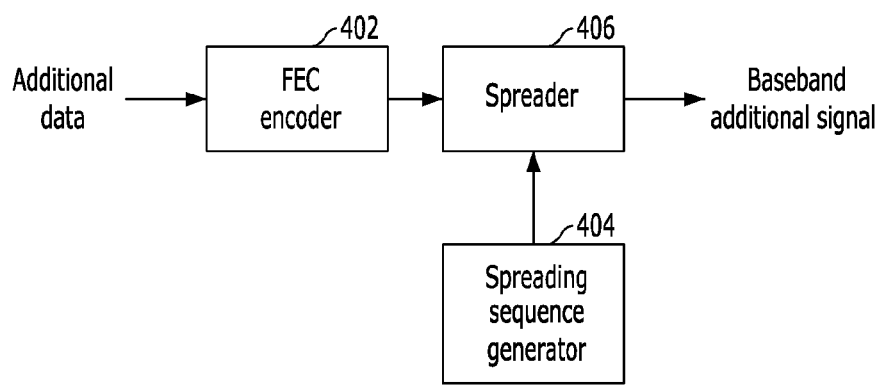
FIG. 4 is a block view of an additional signal generator shown in FIGS. 1 and 2.

FIG. 4 is a block view of an additional signal generator 106 and 204 shown in FIGS. 1 and 2. Referring to FIG. 4, the additional signal generator includes a Forward Error Correction (FEC) encoder 402, a spreading sequence generator 404, and a spreader 406.

The FEC encoder 402 receives additional data and performs error correction encoding onto the additional data. Herein, the additional data inputted to the FEC encoder 402 may be compressed through diverse methods, e.g., H.264 and MPEG-4, the compression method of the additional data may be different according to the system standard and requirements. Also, diverse error correction codes, such as turbo code, Low Density Parity Check (LDPC) code, and a concatenate code, may be used in the FEC encoder 402. The error correction code to be used in the FEC encoder 402 may become different as well according to the system standard and requirements.

The spreading sequence generator 404 generates orthogonal or quasi-orthogonal sequence for spreading the error correction-encoded data obtained in the FEC encoder 402. The spreading sequence generator 404 may generate an orthogonal sequence, such as Walsh sequence, or a quasi-orthogonal sequence, such as Gold sequence, Kasami sequence, Bose-Chadhuri-Hocquenghem (BCH) sequence. Whether to select the orthogonal sequence or the quasi-orthogonal sequence may be determined based on the system standard and requirements.

The spreader 406 maps the error correction-encoded additional data obtained in the FEC encoder 402 to a spreading sequence generated in the spreading sequence generator 404. This process is referred to as spreading. The sampling frequency of the spreading sequence is N times the sampling frequency of the error correction-encoded additional data inputted to the spreader 406, where N is an integer. Therefore, the baseband additional signals outputted from the spreader 406 have a spreading gain as much as dB. Herein, N denotes the length of the spreading sequence.

The FEC encoder 402, the spreading sequence generator 404, and the spreader 406 shown in FIG. 4 may be formed diversely according to the system standard and requirements.

The spreader 406 maps error correction-encoded additional data obtained in the FEC encoder 402 to the spreading sequence generated in the spreading sequence generator 404. This process is referred to as spreading. The sampling frequency of the spreading sequence is N times the sampling frequency of the error correction-encoded additional data inputted to the spreader 406, N being an integer. Thus, the baseband additional signals outputted from the spreader 406 come to have a spreading gain of $10 \cdot \log_{10} N$ dB , where N denotes the length of the spreading sequence.

The FEC encoder 402, the spreading sequence generator 404, and the spreader 406 shown in FIG. 4 may be formed diversely according to the system standard and requirements.

Figure 5:
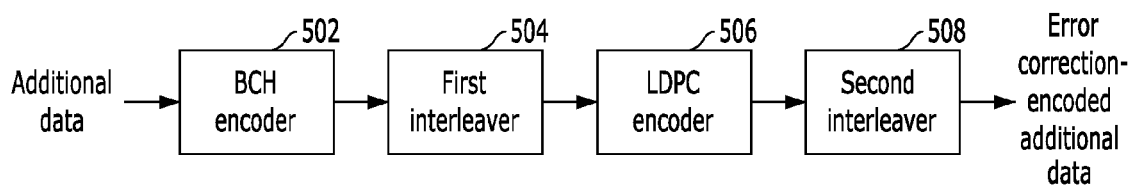
FIG. 5 is a block view of a Forward Error Correction (FEC) encoder shown in FIG. 4.

FIG. 5 is a block view of the FEC encoder shown in FIG. 4. As illustrated in FIG. 5, the FEC encoder 402 includes a BCH encoder 502, a first interleaver 504, an LDPC encoder 506, and a second interleaver 508.

The BCH encoder 502, which is a linear block encoder with excellent random error correction capability, receives the additional data and performs outer encoding. The outer-encoded additional data obtained in the BCH encoder 502 are interleaved in the first interleaver 504.

The LDPC encoder 506, which has excellent error correction capability, receives the interleaved additional data obtained in the first interleaver 504 and performs inner encoding. The inner-encoded additional data obtained in the LDPC encoder 506 are interleaved again in the second interleaver 508 to thereby produce error correction-encoded additional data.

Figures 6, 7:
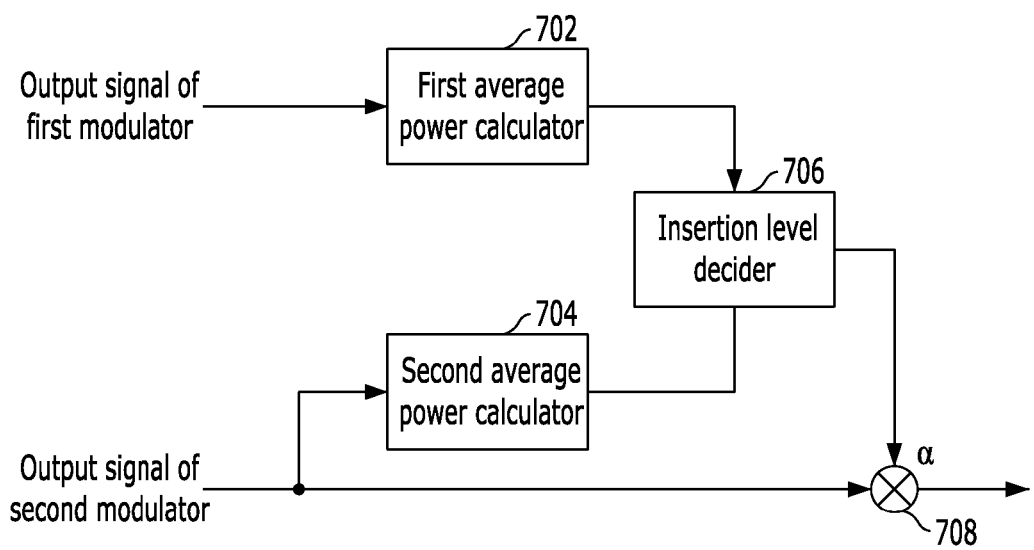
FIG. 6 shows an orthogonal sequence generated in a spreading sequence generator shown in FIG. 4.
FIG. 7 is a block view of an average power controller shown in FIG. 1.

FIG. 6 shows an orthogonal sequence generated in a spreading sequence generator 404 shown in FIG. 4.

The sequence shown in FIG. 6 is a Walsh sequence having a length of 8 and generated in the spreading sequence generator 404 shown in FIG. 4. The Walsh sequence having a length of 8 includes 8 components $W_0, W_1, W_2, W_3, W_4, W_5, W_6, W_7$, as shown in FIG. 6, and the sequences are orthogonal to each other. The Walsh sequence satisfies the following Equation 1.

$$< W_i, W_j > = \sum_{k=0}^{7} W_i(k) \cdot W_j^*(k) = \begin{cases} 8 & i = j \\ 0 & i \neq j \end{cases} \quad \text{Eq. 1}$$

where $W_i(k)$ denotes the $k^{th}$ value of the $i^{th}$ Walsh code $W_i$.

A Walsh sequence having a length of N may be easily generated from Walsh-Hadamard transformation of a Walsh sequence having a length of 2.

The following Tables 1 and 2 describe a spreading process performed in the spreader 406 by using the Walsh sequence having a length of 8, that is, the mapping of the error correction-encoded additional data into a spreading sequence.

TABLE 1

| C(i) c(i + 1) | Mapping Sequence |
| --- | --- |
| 00 | $W_0$ |
| 01 | $W_1$ |
| 10 | $-W_0$ |
| 11 | $-W_1$ |

The Table 1 describes a process of grouping the error correction-encoded additional data obtained in the FEC encoder 402 by two bits (c(i), c(i+1)) and mapping the 2-bit groups to two Walsh sequences $W_0$ and $W_1$. Herein, c(i) denotes the Most Significant Bit (MSB), and c(i+1) denotes the Least Significant Bit (LSB).

TABLE 2

| C(i) c(i + 1) c(i + 2) c(i + 3) | Mapping Sequence |
| --- | --- |
| 0000 | $W_0$ |
| 0001 | $W_1$ |
| 0010 | $W_2$ |
| 0011 | $W_3$ |
| 0100 | $W_4$ |
| 0101 | $W_5$ |
| 0110 | $W_6$ |
| 0111 | $W_7$ |
| 1000 | $-W_7$ |
| 1001 | $-W_6$ |
| 1010 | $-W_5$ |
| 1011 | $-W_4$ |
| 1100 | $-W_3$ |
| 1101 | $-W_2$ |

TABLE 2-continued

| C(i) c(i + 1) c(i + 2) c(i + 3) | Mapping Sequence |
|---|---|
| 1110 | $-W_1$ |
| 1111 | $-W_0$ |

The Table 2 describes a process of grouping the error correction-encoded additional data obtained in the FEC encoder 402 by four bits (c(i), c(i+1), c(i+2), c(i+3)) and mapping the 4-bit groups to 8 Walsh sequences $W_0$, $W_1$, $W_2$, $W_3$, $W_4$, $W_5$, $W_6$, $W_7$. Herein, c(i) denotes the Most Significant Bit (MSB), and c(i+3) denotes the Least Significant Bit (LSB).

FIG. 7 is a block view of the average power controller 110 shown in FIG. 1. The average power controller 110 includes a first average power calculator 702, a second average power calculator 704, an insertion level decider 706, and a multiplier 708.

The first average power calculator 702 receives original signals of a predetermined band outputted from the first modulator 104 and calculates the average power of the original signals. The second average power calculator 704 receives additional signals of a predetermined band outputted from the second modulator 108 and calculates the average power of the additional signals.

The insertion level decider 706 compares the average power of the original signals of the predetermined band, which is obtained in the first average power calculator 702, with the average power of the additional signals of the predetermined band, which is obtained in the second average power calculator 704, and decides an insertion level a. Herein, a is a constant used to make the average power of the additional signals of the predetermined band far lower than the average power of the original signals of the predetermined band.

The multiplier 708 multiples the additional signals of the predetermined band outputted from the second modulator 108 by the insertion level a decided in the insertion level decider 706. As a result, the additional signals of the predetermined band come to have an average power far lower than that of the original signals of the predetermined band.

Figure 8:
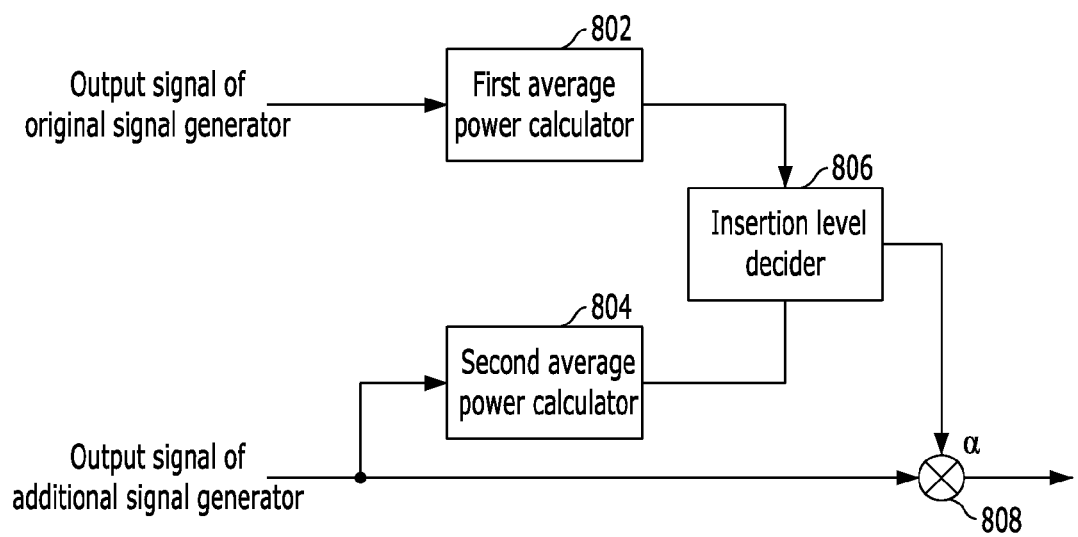
FIG. 8 is a block view of an average power controller shown in FIG. 2.

FIG. 8 is a block view of the average power controller 206 shown in FIG. 2. The average power controller 206 includes a first average power calculator 802, a second average power calculator 804, an insertion level decider 806, and a multiplier 808.

The first average power calculator 802 receives baseband original signals outputted from the original signal generator 202 and calculates the average power of the baseband original signals. The second average power calculator 804 receives baseband additional signals outputted from the additional signal generator 204 and calculates the average power of the baseband additional signals.

The insertion level decider 806 compares the average power of the original signals of the baseband, which is obtained in the first average power calculator 802, with the average power of the additional signals of the baseband, which is obtained in the second average power calculator 804, and decides an insertion level a.

The multiplier 808 multiples the baseband additional signals outputted from the additional signal generator 204 by the insertion level a decided in the insertion level decider 806. As a result, the baseband additional signals come to have an average power far lower than that of the baseband original signals.

The average power controller appearing in the embodiments of FIGS. 7 and 8 decides the insertion level by comparing the average power of the signals with each other. This is no more than an embodiment and the insertion levels may be decided through other methods. For example, the average power controller may decides an appropriate insertion level for the average power of a corresponding signal based on a table including records on the insertion levels suitable for each average power of original signals and additional signals.

Figure 9:
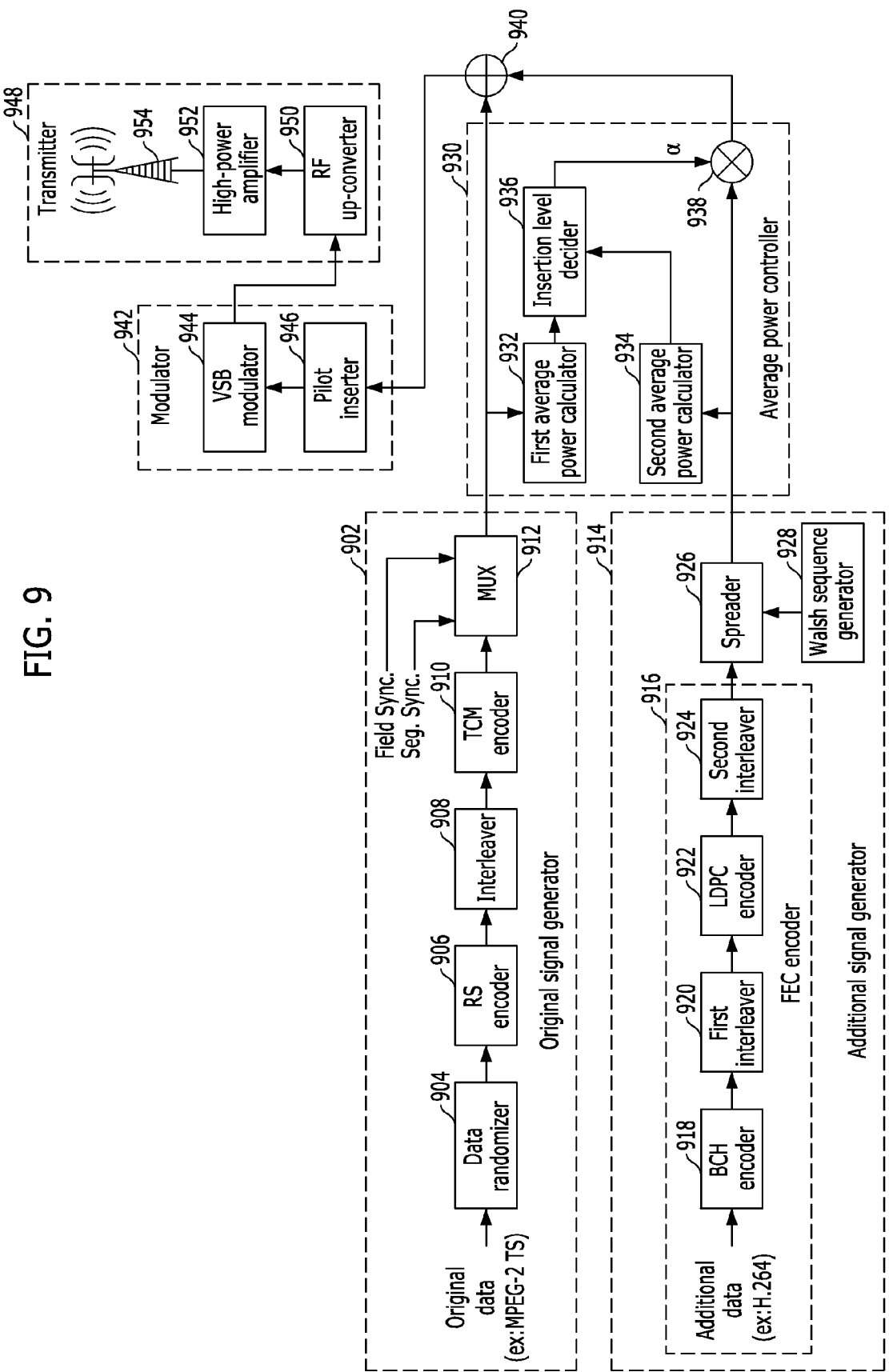
FIG. 9 is a block view illustrating a broadcasting-communication data transmitting apparatus based on the Advanced Terrestrial Systems Committee (ATSC) 8-Vestigial Sideband (VSB) in accordance with yet another embodiment of the present invention.

FIG. 9 is a block view illustrating a broadcasting-communication data transmitting apparatus based on the ATSC 8-VSB standard in accordance with yet another embodiment of the present invention.

Referring to FIG. 9, the broadcasting-communication data transmitting apparatus includes an original signal generator 902, an additional signal generator 914, an average power controller 930, an inserter 940, a modulator 942, and a transmitter 948.

The original signal generator 902 includes a data randomizer 904, a Reed Solomon (RS) encoder 906, an interleaver 908, a TCM encoder 910, and a multiplexer 912.

The additional signal generator 914 includes an FEC encoder 916, a spreader 926, and a Walsh sequence generator 928. Herein, the FEC encoder 916 includes a BCH encoder 918, a first interleaver 920, an LDPC encoder 922, and a second interleaver 924.

The average power controller 930 includes a first average power calculator 932, a second average power calculator 934, an insertion level decider 936, and a multiplier 938.

The modulator 942 includes a VSB modulator 944 and a pilot adder 946.

The transmitter 948 includes an RF up-converter 950, a high-power amplifier 952, and a transmission antenna 954.

Hereafter, a data transmitting process of the broadcasting-communication data transmitting apparatus of FIG. 9 will be described. First, the data randomizer 904 receives original data, e.g., MPEG-2 transport stream, and outputs randomized original data. The randomized original data undergo error correction encoding in the RS encoder and then go through interleaving in the interleaver 908. The TCM encoder 910 receives the interleaved original data and performs TCM inner encoding. The multiplexer 912 multiplexes the inner-encoded original data together with a field synchronization signal and a segment synchronization signal and converts them into baseband ATSC original signals.

Meanwhile, additional data compressed based on such a compression scheme as H.264 are outer-encoded in the BCH encoder 918 and interleaved in the first interleaver 920. The interleaved additional data obtained in the first interleaver 920 are inner-encoded in the LDPC encoder 922, and then interleaved again in the second interleaver 924 to be transformed into error correction-encoded additional data.

The Walsh sequence generator 928 included in the additional signal generator 914 generates a Walsh sequence having orthogonal property to spread the error correction-encoded additional data. The spreader 926 maps the error correction-encoded additional data, which are outputted from the FEC encoder 916, to the Walsh sequence generated in the Walsh sequence generator 928.

The first average power calculator 932 included in the average power controller 930 calculates the average power of baseband ATSC original signals outputted from the multiplexer 912 of the original signal generator 902. The second average power calculator 934 calculates the average power of the baseband additional data outputted from the spreader 926.

The insertion level decider 936 compares the average powers outputted from the first average power calculator 932 and the second average power calculator 934 with each other and determines an insertion level a. The insertion level a is a constant that makes the average power of the baseband additional signals far lower than the average power of the baseband original signals.

The multiplier 938 controls the average power by multiplying the baseband additional signals outputted from the spreader 926 by the insertion level a decided in the insertion level decider 936.

The inserter 940 inserts the baseband additional signals with a controlled average power into the baseband ATSC original signals, which is expressed as the following Equation 2.

$$s(n)=d(n)+\alpha \cdot d'(n) \qquad \text{Eq. 2}$$

where d(n) denotes a baseband ATSC original signal and may have a value among −7, −5, −3, −1, +1, +3, +5, and +7; d'(n) denotes a baseband additional signal; a denotes the insertion level of the baseband additional signal; and s(n) denotes a baseband mixed signal including an additional signal inserted to an original signal.

The mixed signals generated in the inserter 940 are inputted to a pilot adder 946 included in the modulator 942. The pilot adder 946 adds a pilot signal to a baseband mixed signal outputted from the inserter 940, which is expressed as the following Equation 3.

$$t(n)=s(n)+1.25 \qquad \text{Eq. 3}$$

where the number 1.25 denotes a pilot signal added to a mixed signal s(n); and t(n) denotes a baseband mixed signal with a pilot signal added thereto.

The VSB modulator 944 modulates the baseband mixed signals with a pilot signal added thereto into VSB signals of a predetermined band.

The RF up-converter 950 included in the transmitter 948 up-converts the VSB-modulated mixed signals of the predetermined band into RF signals. The RF signals obtained in the RF up-converter 950 are amplified by the high-power amplifier 952 and wirelessly transmitted through the transmission antenna 954.

In the above, the broadcasting-communication data transmitting apparatus and method according to the present invention have been described. Hereafter, a broadcasting-communication data receiving apparatus and method will be described.

Figure 10:
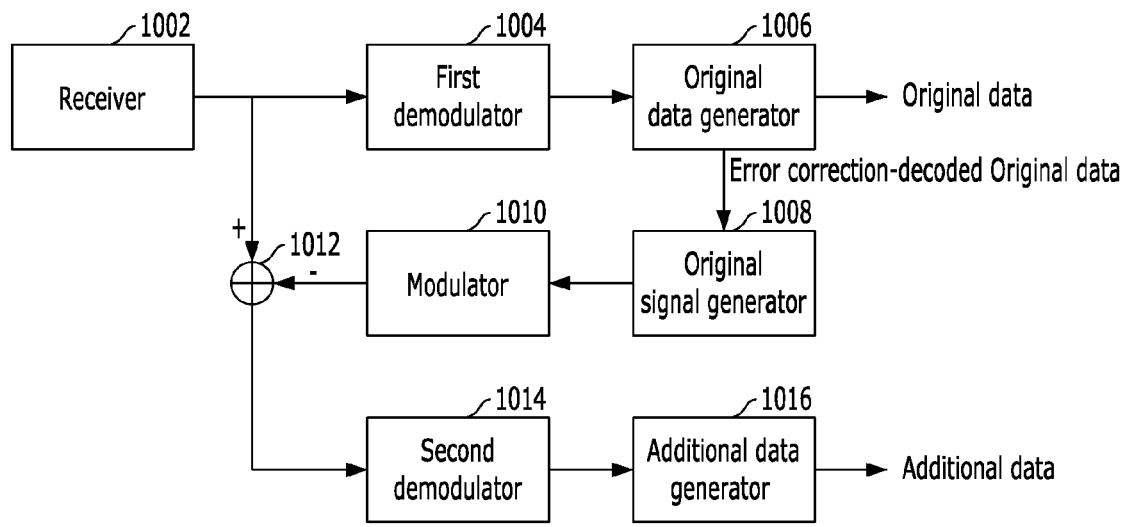
FIG. 10 is a block view describing a broadcasting-communication data receiving apparatus in accordance with a first embodiment of the present invention.

FIG. 10 is a block view describing a broadcasting-communication data receiving apparatus in accordance with a first embodiment of the present invention.

Referring to FIG. 10, the broadcasting-communication data receiving apparatus includes a receiver 1002, a first demodulator 1004, an original data generator 1006, an original signal generator 1008, a modulator 1010, a subtractor 1012, a second demodulator 1014, and an additional data generator 1016.

The receiver 1002 receives mixed signals including original signals and additional signals mixed with each other, which are transmitted from a broadcasting-communication data transmitting apparatus. If necessary, the receiver 1002 may convert the mixed signals into mixed signals of a predetermined band.

The first demodulator 1004 receives mixed signals of a predetermined band and generates baseband mixed signals. The original data generator 1006 receives the baseband mixed signals outputted from the first demodulator 1004 and restores original data.

The original signal generator 1008 receives error correction-decoded original data outputted from the original data generator 1006 and generates the baseband original signals without an additional signal again. The modulator 1010 receives the baseband original signals generated through the original signal generator 1008 and converts them into the same band as the predetermined band of the mixed signals outputted from the receiver 1002.

The subtractor 1012 generates additional signals of a predetermined band by subtracting the additional signals of the predetermined band outputted from the modulator 1010 from the mixed signals of the predetermined band outputted from the receiver 1002.

The second demodulator 1014 receives the additional signals of the predetermined band outputted from the subtractor 1012 and generates baseband additional signals. The additional data generator 1016 receives the baseband additional signals and restores the additional data.

Figure 11:
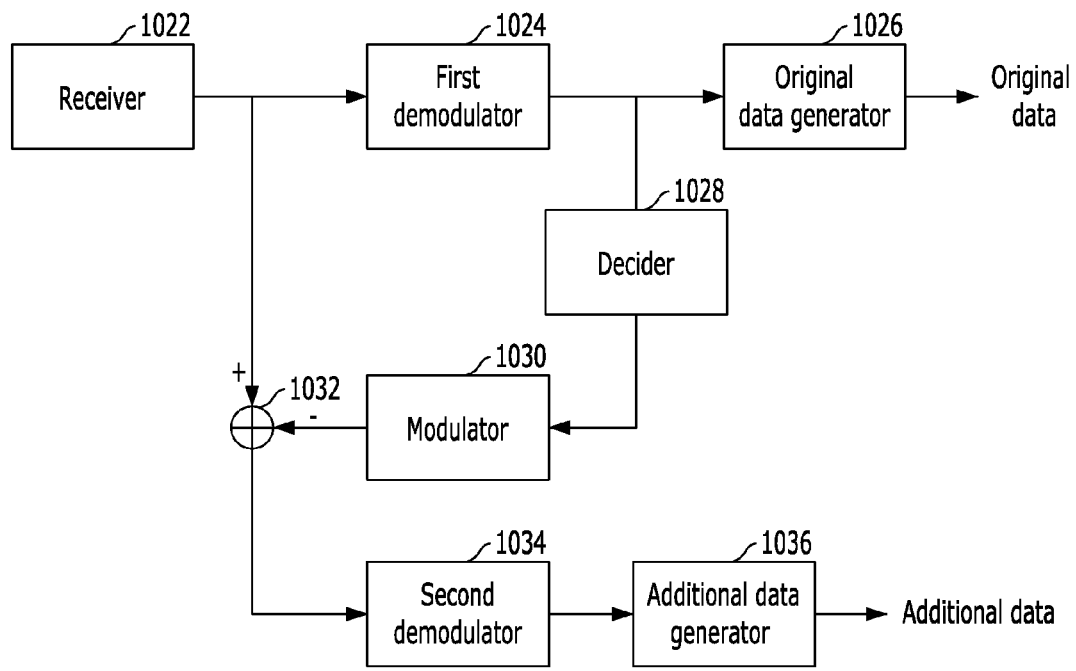
FIG. 11 is a block view describing a broadcasting-communication data receiving apparatus in accordance with a second of the present invention.

FIG. 11 is a block view describing a broadcasting-communication data receiving apparatus in accordance with a second of the present invention. Referring to FIG. 11, the broadcasting-communication data receiving apparatus includes a receiver 1022, a first demodulator 1024, an original data generator 1026, a decider 1028, a modulator 1030, a subtractor 1032, a second demodulator 1034, and an additional data generator 1036.

The receiver 1022 receives mixed signals including original signals and additional signals mixed with each other from a broadcasting-communication data transmitting apparatus. If necessary, the receiver 1022 may convert the mixed signals into mixed signals of a predetermined band.

The first demodulator 1024 receives the mixed signals of the predetermined band and generates baseband mixed signals. The original data generator 1026 receives the baseband mixed signals outputted from the first demodulator 1024 and restores original data.

The decider 1028 receives the baseband mixed signals outputted from the first demodulator 1024 and makes a decision to have only baseband original signals without additional signals. In other words, the decider 1028 removes the components including the additional signals, other than the baseband original signals, and leaves only the baseband original signals of the baseband mixed signals outputted from the first demodulator 1024. For example, when an original signal component to be transmitted from a transmitting apparatus is an integer number '7' and an additional signal is '0.2' and noise occurring during the transmission is '0.3,' the mixed signal inputted to the decider 1028 becomes 7.5. The decider 1028 removes '0.5' from '7.5,' leaving only the original signal component '7.'

The modulator 1030 receives the baseband original signals of the predetermined band decided in the decider 1028 and converts the baseband original signals into the same band as the predetermined band of the mixed signals outputted from the receiver 1022.

The subtractor 1032 generates additional signals of a predetermined band by subtracting the original signals of the predetermined band outputted from the modulator 1030 from the mixed signals of the predetermined band outputted from the receiver 1022.

The second demodulator 1034 receives the additional signals of the predetermined band outputted from the subtractor 1032 and generates baseband additional signals. The additional data generator 1036 receives the baseband additional signals and restores additional signals.

The broadcasting-communication data receiving apparatus shown in FIGS. 10 and 11 is appropriate for receiving mixed signals transmitted from a transmitting apparatus including a first modulator and a second modulator separately, like the broadcasting-communication data transmitting apparatus shown in FIG. 1.

Figure 12:
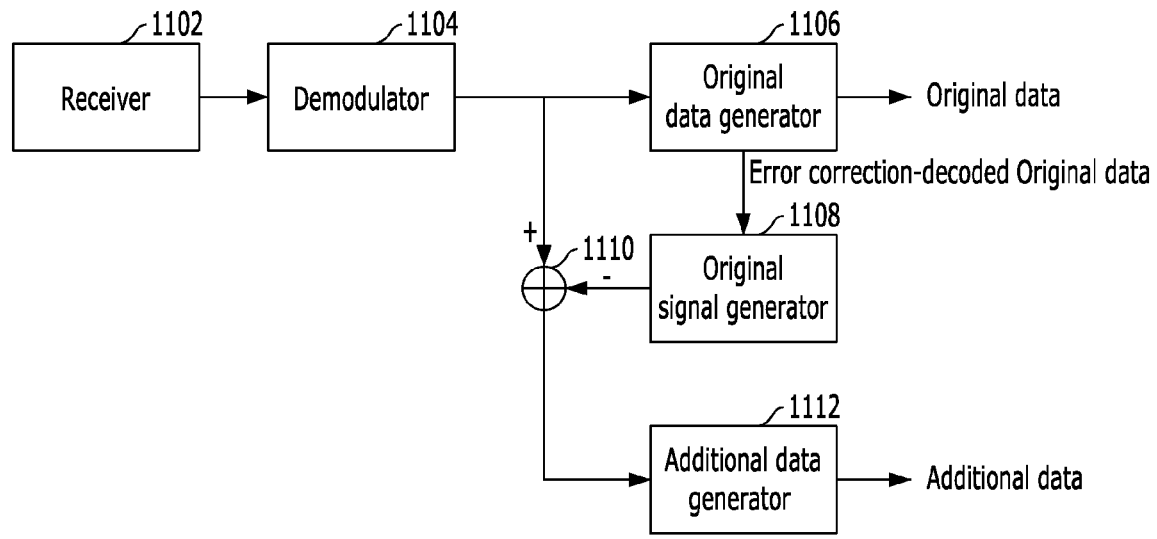
FIG. 12 is a block view describing a broadcasting-communication data receiving apparatus in accordance with a third embodiment of the present invention.

FIG. 12 is a block view describing a broadcasting-communication data receiving apparatus in accordance with a third embodiment of the present invention. Referring to FIG. 12, the broadcasting-communication data receiving apparatus includes a receiver 1102, a demodulator 1104, an original data generator 1106, an original signal generator 1108, a subtractor 1110, and an additional data generator 1112.

The receiver 1102 receives mixed signals including original signals and additional signals mixed with each other from a broadcasting-communication data transmitting apparatus. If necessary, the receiver 1102 may convert the mixed signals into mixed signals of a predetermined band.

The demodulator 1104 receives the mixed signals of the predetermined band and generates baseband mixed signals.

The original data generator 1106 receives the baseband mixed signals outputted from the demodulator 1104 and restores original data.

The original signal generator 1108 receives error correction-decoded original data outputted from the original data generator 1106 and generates baseband original signals without additional signals therein again.

The subtractor 1110 generates baseband additional signals by subtracting the baseband original signals outputted from the original signal generator 1108 out of the baseband mixed signals outputted from the demodulator 1104.

The additional data generator 1112 receives the baseband additional signals and restores additional signals.

Figure 13:
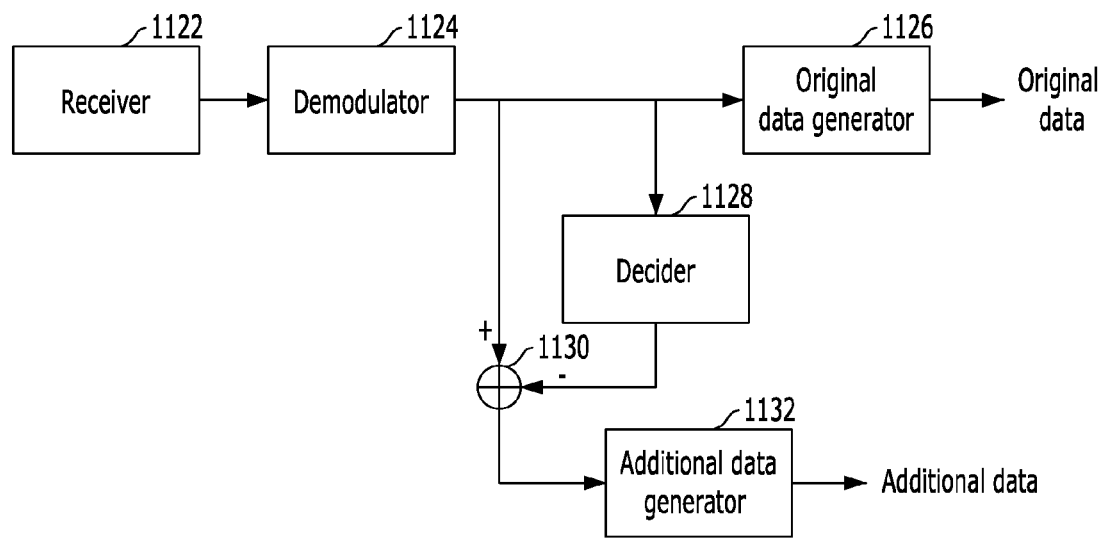
FIG. 13 is a block view describing a broadcasting-communication data receiving apparatus in accordance with a fourth embodiment of the present invention.

FIG. 13 is a block view describing a broadcasting-communication data receiving apparatus in accordance with a fourth embodiment of the present invention. Referring to FIG. 13, the broadcasting-communication data receiving apparatus includes a receiver 1122, a demodulator 1124, an original data generator 1126, a decider 1128, a subtractor 1130, and an additional data generator 1132.

The receiver 1122 receives mixed signals including original signals and additional signals mixed with each other from a broadcasting-communication data transmitting apparatus. If necessary, the receiver 1122 may convert the mixed signals into mixed signals of a predetermined band.

The demodulator 1124 receives the mixed signals of the predetermined band and generates baseband mixed signals.

The original data generator 1126 receives the baseband mixed signals outputted from the demodulator 1124 and restores original data.

The decider 1128 receives the baseband mixed signals outputted from the demodulator 1124 and makes a decision to have only baseband original signals without additional signals. In other words, the decider 1128 removes the components including the additional signals, other than the baseband original signals, of the baseband mixed signals outputted from the demodulator 1124, and leaves only the baseband original signals.

The subtractor 1130 generates baseband additional signals by subtracting the baseband original signals outputted from the decider 1128 out of the baseband mixed signals outputted from the demodulator 1124.

The additional data generator 1132 receives the baseband additional signals and restores additional signals.

The broadcasting-communication data receiving apparatus shown in FIGS. 12 and 13 is appropriate for receiving mixed signals transmitted from a transmitting apparatus including a single modulator 210, like the broadcasting-communication data transmitting apparatus shown in FIG. 2.

Figure 14:
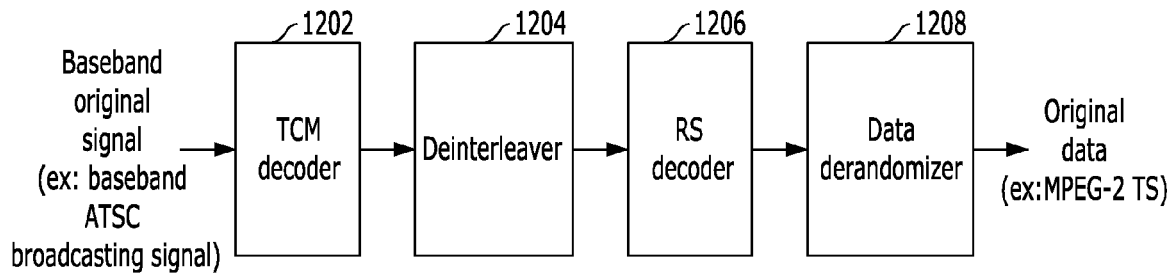
FIG. 14 is a block view describing an original data generator shown in FIGS. 10 to 13.

FIG. 14 is a block view describing the original data generator shown in FIGS. 10 to 13. Referring to FIG. 14, the original data generator includes a TCM decoder 1202, a deinterleaver 1204, an RS decoder 1206, and a data derandomizer 1208.

The TCM decoder 1202 receives baseband original signals, e.g., baseband ATSC broadcasting signals, and performs inner decoding on the baseband original signals to thereby primarily remove noise included therein.

The deinterleaver 1204 receives the baseband original signals without noise outputted from the TCM decoder 1202 and outputs deinterleaved baseband original signals.

The RS decoder 1206 receives the deinterleaved baseband original signals and performs outer decoding to thereby secondarily remove noise.

The data derandomizer 1208 receives the baseband original signals outputted from the RS decoder 1206 and derandomizes the baseband original signal to thereby generate original data, e.g., MPEG-2 transport stream.

The original data generator of the broadcasting-communication data receiving apparatus of the present invention is not limited to the ATSC 8-VSB system as shown in FIG. 14, and it may adopt diverse kinds of broadcasting-communication standards.

Particularly, according to the ATSC 8-VSB transmission standard, the original signal generator of FIGS. 10 to 13 may transmit symbol-level output signals outputted from the TCM decoder 1202 to the modulator 1010 or the subtractor 1110. This is performed to prevent an ambiguity problem of a TCM code. The ambiguity problem of a TCM code is a phenomenon that different outputs are acquired according to the state of a memory although the same inputs are made. This occurs because the initial state of a memory of a TCM encoder is not uniform.

Figure 15:
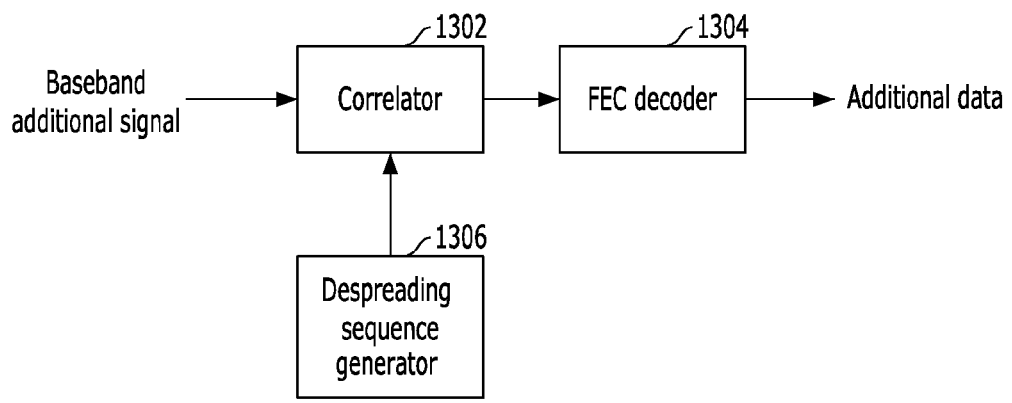
FIG. 15 is a block view describing an additional data generator shown in FIGS. 10 to 13.

FIG. 15 is a block view describing the additional data generator shown in FIGS. 10 to 13. Referring to FIG. 15, the additional data generator includes a correlator 1302, an FEC decoder 1304, and a despreading sequence generator 1306.

The despreading sequence generator 1306 generates an orthogonal or quasi-orthogonal sequence for despreading baseband additional signals inputted to the correlator 1302. The despreading sequence generator 1306 may generate an orthogonal sequence, e.g., Walsh sequence, or a quasi-orthogonal sequence, e.g., Gold sequence, Kasami sequence, and Bose-Chadhuri-Hocquenghem (BCH) sequence, which corresponds to the spreading sequence generator of the broadcasting-communication data transmitting apparatus of the present invention. Whether to select an orthogonal sequence or a quasi-orthogonal sequence may depend on the system standard and requirements.

The correlator 1302 calculates correlation values by correlating the inputted baseband additional signals with the despreading sequence generated in the despreading sequence generator 1306 and selects the largest correlation value among the correlation values. Therefore, the additional signals outputted from the correlator 1302 come to have a spreading gain as much as $10 \cdot \log_{10} N$ dB due to the correlation, where N denotes the length of the despreading sequence.

The FEC decoder 1304 removes noise caused during the signal transmission from the baseband additional signals having the spreading gain as much as $10 \cdot \log_{10} N$ dB and outputted from the correlator 1302. Herein, the FEC decoder 1304 may use diverse error correction codes, such as a turbo code, an LDPC code, a concatenate code and so forth. The error correction code may be selected according to the system standard and requirements.

The correlator 1302, the FEC decoder 1304, and the despreading sequence generator 1306 may be formed diversely according to the system standard and requirements.

FIG. 16 shows an orthogonal sequence generated in the despreading sequence generator 1306 shown in FIG. 15.

The spreading sequence shown in FIG. 16 is a Walsh sequence having a length of 8. The Walsh sequence having a length of 8 includes 8 components $W_0, W_1, W_2, W_3, W_4, W_5, W_6, W_7$, and the sequences are orthogonal to each other. The Walsh sequence satisfies the following Equation 4.

$$<W_i, W_j> = \sum_{k=0}^{7} W_i(k) \cdot W_j^*(k) = \begin{cases} 8 & i = j \\ 0 & i \neq j \end{cases} \quad \text{Eq. 4}$$

where $W_i(k)$ denotes the $k^{th}$ value of the $i^{th}$ Walsh code; and * denotes a conjugate.

A Walsh sequence having a length of N may be easily generated from Walsh-Hadamard transformation of a Walsh sequence having a length of 2.

Figure 17:
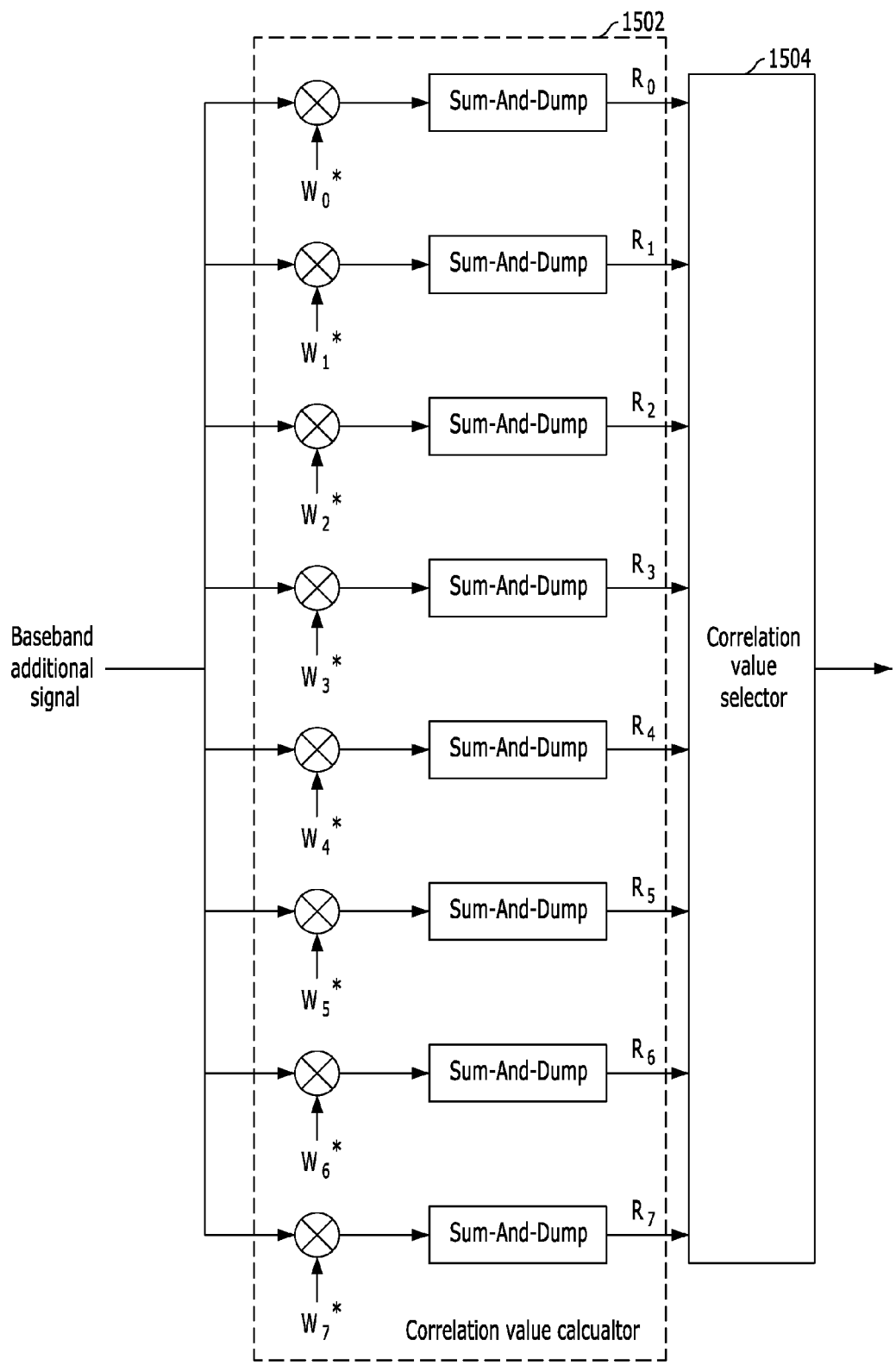
FIG. 17 is a block view of a correlator shown in FIG. 15.

FIG. 17 is a block view of the correlator 1302 shown in FIG. 15. Referring to FIG. 17, the correlator 1302 includes a correlation value calculator 1502 and a correlation value selector 1504.

The correlation value calculator 1502 multiples the baseband additional signals by conjugates of the sequences $W_0$, $W_1, W_2, W_3, W_4, W_5, W_6, W_7$ generated in the despreading sequence generator 1306, which is a despreading process, and calculates correlation values $R_0, R_1, R_2, R_3, R_4, R_5, R_6$ and $R_7$ through a sum-and-dump process.

The correlation value selector 1504 selects one whose absolute value is the largest among the correlation values $R_0$, $R_1, R_2, R_3, R_4, R_5, R_6$ and $R_7$ obtained in the correlation value calculator 1502, and the sign for the value follows the sign of the value before the value takes on the absolute mark. The output of the correlation value selector 1504 is expressed as the following Equation 5.

$$\text{Output of correlator} = sgn(R_{i_{max}}) \cdot |R_{i_{max}}| = R_{i_{MAX}} \quad \text{Eq. 5}$$

Herein, sgn( ) and | | denote a sign and an absolute value, respectively, and $i_{max}$ denotes the index of the largest value among the absolute values of the correlation values. The $i_{max}$ is expressed as the following Equation 6.

$$i_{max} = \arg_i \max |R_i| \quad \text{Eq. 6}$$

Figure 18:
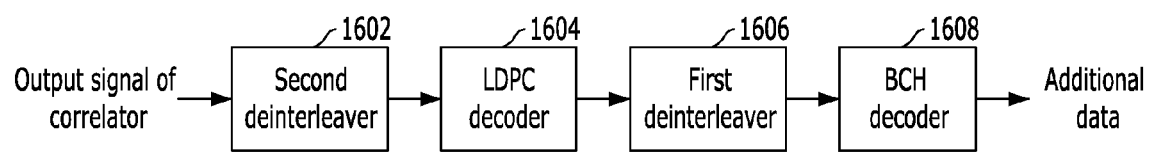
FIG. 18 is a block view of an FEC decoder shown in FIG. 15.

FIG. 18 is a block view of the FEC decoder 1304 shown in FIG. 15. Referring to FIG. 18, the FEC decoder 1304 includes a second deinterleaver 1602, an LDPC decoder 1604, a first deinterleaver 1606, and a BCH decoder 1608.

The second deinterleaver 1602 receives the baseband additional signals having a spreading gain, which are outputted from the correlator 1302 and outputs deinterleaved baseband additional signals. The LDPC decoder 1604 receives the deinterleaved baseband additional signals obtained in the second deinterleaver 1602 and primarily removes noise caused during a transmission process.

The first deinterleaver 1606 receives the additional signals without noise, which are obtained in the LDPC decoder 1604 and outputs deinterleaved additional signals. The BCH decoder 1608 receives the deinterleaved additional signals obtained in the first deinterleaver 1606, secondarily removes the noise caused in the transmission process, and generates error correction-decoded additional data.

Figure 19:
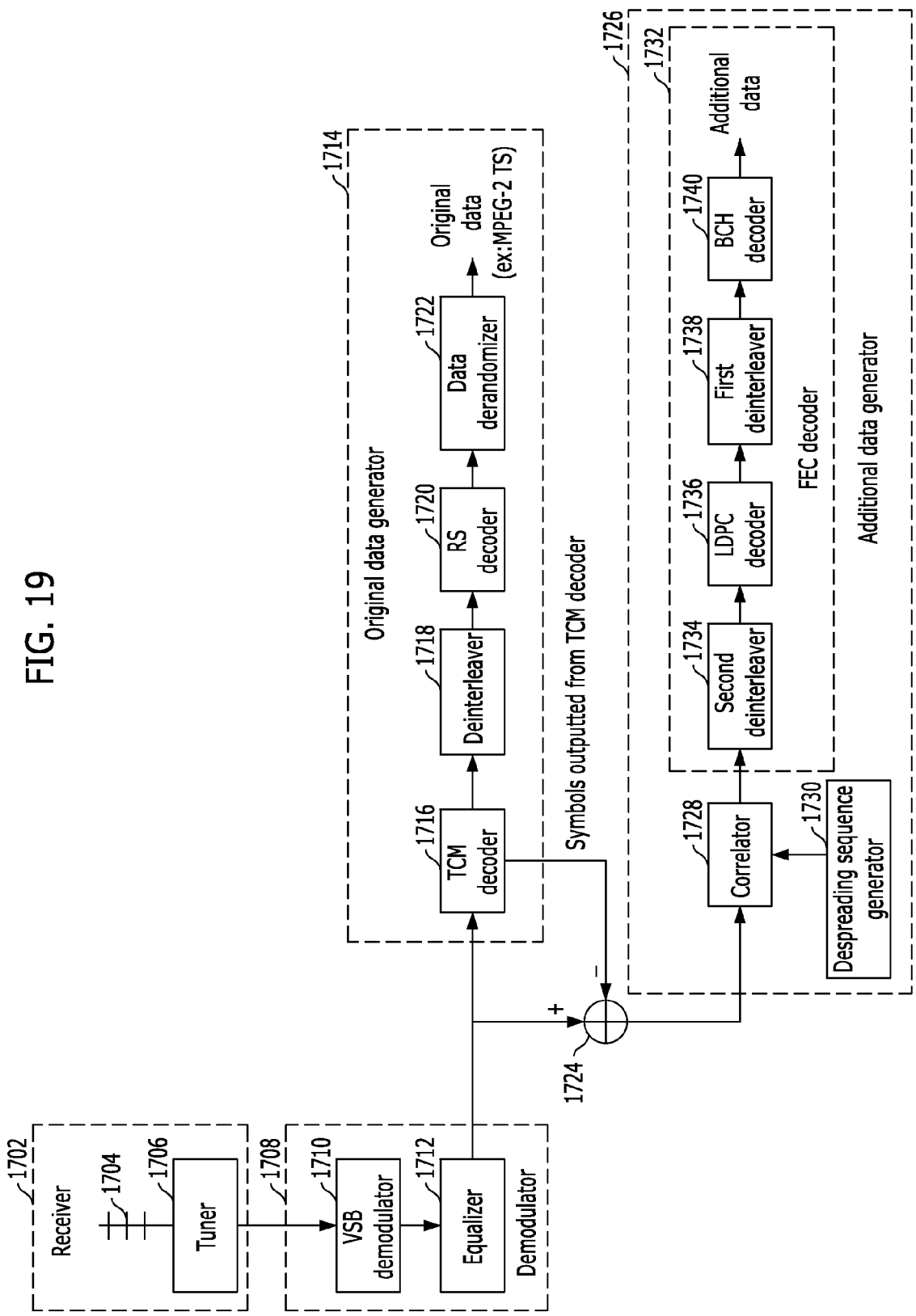
FIG. 19 is a block view illustrating a broadcasting-communication receiving apparatus based on the ATSC 8-VSB standard in accordance with a fifth embodiment of the present invention.

FIG. 19 is a block view illustrating a broadcasting-communication receiving apparatus based on the ATSC 8-VSB standard in accordance with a fifth embodiment of the present invention. Referring to FIG. 19, the broadcasting-communication receiving apparatus includes a receiver 1702, a demodulator 1708, an original data generator 1714, a subtractor 1724, and an additional data generator 1726.

The receiver 1702 includes a reception antenna 1704 and a tuner 1706. Also, the demodulator 1708 includes a VSB demodulator 1710 and an equalizer 1712.

The original data generator 1714 includes a TCM decoder 1716, a deinterleaver 1718, an RS decoder 1720, and a data derandomizer 1722.

The additional data generator 1726 includes a correlator 1728, a despreading sequence generator 1730, and an FEC decoder 1732.

The FEC decoder 1732 includes a second deinterleaver 1734, an LDPC decoder 1736, a first deinterleaver 1738, and a BCH decoder 1740.

Hereafter, a data receiving method of the broadcasting-communication data receiving apparatus shown in FIG. 19 will be described in detail. First, the reception antenna 1704 receives mixed signals including original signals and additional signals mixed with each other from a broadcasting-communication data transmitting apparatus. The mixed signals are converted into mixed signals of a predetermined band through the tuner 1706 included in the receiver 1702.

The VSB demodulator 1710 receives the mixed signals of the predetermined band outputted from the tuner 1706 and converts them into baseband mixed signals. The equalizer 1712 receives the baseband mixed signals and removes multi-path signals generated during a transmission process.

The TCM decoder 1716 primarily removes the noise caused during the transmission process out of the baseband mixed signals without the multi-path signals, which are obtained in the equalizer 1712. The deinterleaver 1718 deinterleaver the baseband mixed signals with noise primarily removed.

The RS decoder 1720 secondarily removes noise caused during the transmission process out of the deinterleaved mixed signals. The data derandomizer 1722 derandomizes the baseband mixed signals without noise obtained from the RS decoder 1720 and generates original data, e.g., MPEG-2 transport stream.

Meanwhile, the subtractor 1724 subtracts symbol-level output signals of the TCM decoder 1716, which correspond to the original signals, from the baseband mixed signals outputted from the equalizer 1712 to thereby leave only baseband additional signals.

The despreading sequence generator 1730 generates an orthogonal or quasi-orthogonal sequence for despreading the baseband additional signals outputted from the subtractor 1724. The correlator 1728 calculates correlation values by correlating the despreading sequence generated in the despreading sequence generator 1730 with the baseband additional signals outputted from the subtractor 1724, and selects the largest correlation value among the correlation values.

The baseband additional signals having a spreading gain outputted from the correlator 1728 are deinterleaved in the second deinterleaver 1734. The LDPC decoder 1736 decodes the deinterleaved additional signals to thereby primarily remove noise caused during the transmission process.

The first deinterleaver 1738 deinterleaver the output signals of the LDPC decoder 1736. The BCH decoder 1740 secondarily removes noise from the deinterleaved baseband additional signals outputted from the first deinterleaver 1738 to thereby generate error correction-decoded additional data.

The apparatus and method of the present invention described above is advantageous in that it can improve the overall transmission efficiency of a system by transmitting new additional data while maintaining the data transmission rate of original data. In short, the apparatus and method of the present invention can transmit/receive additional data while maintaining the bandwidth for transmitting original data and compatibility with conventional data transmission/reception systems.

Particularly, when data are transmitted, the apparatus and method of the present invention can easily separate original signals and additional signals from each other in the receiving part, compared to the prior art, because additional signals are inserted to original data by controlling the average power of the additional data. Also, the data transmission/reception method of the present invention can transmit more additional data than the prior art, which is advantageous as well.

The broadcasting-communication data transmitting/receiving method and apparatus of the present invention described above is appropriate for broadcasting systems, e.g., ATSC, DVB, DMB, ISDB-T, and communication systems, e.g., WiBro, but it is not limited to them and it can be applied to any environments requiring general additional data transmission.

While the present invention has been described with respect to the specific embodiments, it will be apparent to those skilled in the art that various changes and modifications may be made without departing from the spirit and scope of the invention as defined in the following claims.

What is claimed is:

1. An apparatus for transmitting broadcasting-communication data including original data and additional data, comprising:

an original signal generator configured to receive the original data and generate baseband original signals;

a first modulator configured to receive the baseband original signals and generate original signals of a predetermined band;

an additional signal generator configured to receive the additional data and generate baseband additional signals;

a second modulator configured to receive the baseband additional signals and generate additional signals of a predetermined band;

an average power controller configured to control an average power of the additional signals of the predetermined band;

an inserter configured to insert the additional signals of the predetermined band with a controlled average power to the original signals of the predetermined band to thereby generate mixed signals of a predetermined band; and a transmitter configured to transmit the mixed signals of the predetermined band.

2. The apparatus of claim 1, wherein the original signal generator includes:

a randomizer configured to receive the original data and output randomized original data;

an outer encoder configured to receive the randomized original data and output outer-encoded original data;

an interleaver configured to receive the outer-encoded original data and output interleaved original data;

an inner encoder configured to receive the interleaved original data and output inner-encoded original data; and a multiplexer configured to receive the inner-encoded original data and multiplex the inner-encoded original data with a field synchronization signal and a segment synchronization signal to thereby generate the baseband original signals.

3. The apparatus of claim 1, wherein the additional signal generator includes:

an error correction encoder configured to receive the additional data and output error correction-encoded additional data;

a spreading sequence generator configured to generate an orthogonal or quasi-orthogonal spreading sequence; and a spreader configured to map the error correction-encoded additional data to the spreading sequence to thereby generate the baseband additional signals.

4. The apparatus of claim 3, wherein the error correction encoder includes:

an encoder configured to receive the additional data and output encoded additional data for removing noise; and an interleaver configured to receive the encoded additional data for removing noise and output interleaved additional data.

5. The apparatus of claim 1, wherein the average power controller includes:

a first average power calculator configured to calculate an average power of the original signals of the predetermined band generated in the first modulator;

a second average power calculator configured to calculate an average power of the additional signals of the predetermined band generated in the second modulator;

an insertion level decider configured to receive and compare the average power of the original signals of the predetermined band in the first average power calculator and the average power of the additional signals of the predetermined band in the second average power calculator and determine an insertion level; and a multiplier configured to multiply the additional signals of the predetermined band generated in the second modulator by the insertion level to thereby control the average power of the additional signals of the predetermined band.

6. A method for transmitting broadcasting-communication data including original data and additional data, comprising:

receiving the original data and generating baseband original signals;

receiving the baseband original signals and generating original signals of a predetermined band;

receiving the additional data and generating baseband additional signals;

receiving the baseband additional signals and generating additional signals of a predetermined band;

controlling an average power of the additional signals of the predetermined band;

inserting the additional signals of the predetermined band with a controlled average power to the original signals of the predetermined band to thereby generate mixed signals of a predetermined band; and transmitting the mixed signals of the predetermined band.

7. The method of claim 6, wherein said receiving the original data and generating the baseband original signals include:

receiving the original data and outputting randomized original data;

receiving the randomized original data and outputting outer-encoded original data;

receiving the outer-encoded original data and outputting interleaved original data;

receiving the interleaved original data and outputting inner-encoded original data; and receiving the inner-encoded original data and multiplexing the inner-encoded original data with a field synchronization signal and a segment synchronization signal to thereby generate the baseband original signals.

8. The method of claim 6, wherein said receiving the additional data and generating the baseband additional signals include:
- receiving the additional data and outputting error correction-encoded additional data;
- generating an orthogonal or quasi-orthogonal spreading sequence; and
- mapping the error correction-encoded additional data to the spreading sequence to thereby generate the baseband additional signals.

9. The method of claim 8, wherein said receiving the additional data and outputting the error correction-encoded additional data include:
- receiving the additional data and outputting encoded additional data for removing noise; and
- receiving the encoded additional data for removing noise and outputting interleaved additional data.

\* \* \* \* \*